(12) United States Patent
Kessler et al.

(10) Patent No.: US 9,255,635 B2
(45) Date of Patent: Feb. 9, 2016

(54) FASTENING DEVICE ON THE UNDERBODY OF A MOTOR VEHICLE

(71) Applicant: Volkswagen Aktiengesellschaft, Wolfsburg (DE)

(72) Inventors: Joern Kessler, Langen (DE); Martin Remmert, Ribbesbuettel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 415 days.

(21) Appl. No.: 13/672,127

(22) Filed: Nov. 8, 2012

(65) Prior Publication Data

US 2013/0087678 A1 Apr. 11, 2013

Related U.S. Application Data

(63) Continuation of application No. PCT/EP2011/001240, filed on Mar. 14, 2011.

(30) Foreign Application Priority Data

May 8, 2010 (DE) .......................... 10 2010 019 928

(51) Int. Cl.
*F16H 59/02* (2006.01)
*B60K 20/04* (2006.01)

(52) U.S. Cl.
CPC ............ *F16H 59/0278* (2013.01); *B60K 20/04* (2013.01); *F16H 59/0208* (2013.01)

(58) Field of Classification Search
CPC .. B60K 20/04; F16H 59/0278; F16H 59/0208
USPC ........ 74/18–18.2, 473.1–473.35, 556, 511 R; 180/90.6, 377, 381, 382; 403/202, 203, 403/220–229, 134, 50, 51, 288; 296/24.34, 296/1.08
See application file for complete search history.

(56) References Cited

U.S. PATENT DOCUMENTS

| | | | | |
|---|---|---|---|---|
| 3,732,746 A | * | 5/1973 | Fitzpatrick | 74/473.29 |
| 4,018,099 A | | 4/1977 | O'Brien et al. | |
| 4,237,998 A | * | 12/1980 | Matayoshi | 181/175 |
| 4,522,081 A | * | 6/1985 | Mackin et al. | 74/473.36 |
| 5,106,143 A | * | 4/1992 | Soeters | 296/37.8 |
| 5,357,823 A | * | 10/1994 | Parsons | 74/473.34 |
| 5,560,253 A | * | 10/1996 | Ishikawa et al. | 74/473.3 |
| 5,749,261 A | * | 5/1998 | Numakami | 74/18.1 |
| 5,887,485 A | * | 3/1999 | VanOrder et al. | 74/473.15 |
| 5,970,814 A | * | 10/1999 | Smith et al. | 74/473.15 |

(Continued)

FOREIGN PATENT DOCUMENTS

| | | |
|---|---|---|
| DE | 296 03 542 U1 | 6/1996 |
| RU | 40 775 U1 | 9/2004 |
| SU | 1320476 A1 | 6/1987 |

*Primary Examiner* — William Kelleher
*Assistant Examiner* — Thomas Magnuson
(74) *Attorney, Agent, or Firm* — Muncy, Geissler, Olds & Lowe, P.C.

(57) ABSTRACT

A fastening device on an underbody of a motor vehicle is provided, via which a shifting device may be fastened to the underbody. The shifting device comprises a floor shift protruding into the vehicle interior and is covered by a central console, which may be fixedly connected to the underbody via at least one retaining element. A damping cap is provided, covering the shifting device and having a through-passage for the floor shift, and the retaining element may be fastened to the underbody by the interposition of the damping cap.

16 Claims, 5 Drawing Sheets

(56) References Cited

U.S. PATENT DOCUMENTS

| | | | | |
|---|---|---|---|---|
| 5,992,264 | A * | 11/1999 | Brock, Sr. | 74/502.6 |
| 6,267,217 | B1 * | 7/2001 | Malone et al. | 192/218 |
| 7,222,906 | B2 * | 5/2007 | Sakakibara et al. | 296/24.34 |
| 7,631,917 | B2 * | 12/2009 | Kwolek | 296/24.34 |
| 7,802,831 | B2 * | 9/2010 | Isayama et al. | 296/24.34 |
| 8,701,819 | B2 * | 4/2014 | Porcs | 180/336 |
| 2004/0255710 | A1 * | 12/2004 | Tucker | 74/473.29 |
| 2005/0189160 | A1 * | 9/2005 | Oana | 180/336 |
| 2013/0057010 | A1 * | 3/2013 | Vasko et al. | 296/24.34 |
| 2013/0145882 | A1 * | 6/2013 | Hartleip et al. | 74/473.3 |

* cited by examiner

FASTENING DEVICE ON THE UNDERBODY OF A MOTOR VEHICLE

This nonprovisional application is a continuation of International Application No. PCT/EP2011/001240, which was filed on Mar. 14, 2011, and which claims priority to German Patent Application No. DE 10 2010 019.928.1, which was filed in Germany on May 8, 2010, and which are both herein incorporated by reference.

BACKGROUND OF THE INVENTION

1. Field of the Invention

The present invention relates to a fastening device on the underbody of a motor vehicle and relates to a damping cap.

2. Description of the Background Art

In so-called floor shifts in motor vehicles, in particular passenger motor vehicles, a shifting device is provided, the shifting device mounting the upwardly protruding shift lever and being connected to a variable speed transmission of the motor vehicle through the underbody or actuating elements penetrating a center tunnel.

In a generic fastening device, the shifting device as such is covered by a central console, wherein the floor shift extends through a sleeve into the vehicle interior. Furthermore, it has already been disclosed in DE 296 03 542 U1 to arrange a damping cap over the shifting device for improved noise damping in the direction of the vehicle interior.

Add-on components are screwed in the unfinished state to the underbody of the vehicle bodywork. The shift housing of the shifting device is introduced from below into the center tunnel formed in the underbody and screwed there. Moreover, retaining elements or retaining brackets for the central console as well as the aforementioned damping cap may be screwed to the underbody. The mounting of these add-on components is associated with high cost in terms of production technology and components.

SUMMARY OF THE INVENTION

It is therefore an object of the invention to provide a fastening device that may be used in a flexible manner, which may be produced advantageously in terms of production technology and which permits particularly simple, rapid mounting.

In an embodiment, a damping cap is provided for soundproofing. The damping cap being configured to cover the shifting device and having a through-passage for the floor shift. A retaining element for the central console is in this case able to be fastened to the underbody of the motor vehicle by the interposition of the damping cap. According to an embodiment of the invention, the retaining element for the central console is no longer directly fastened to the underbody but indirectly via the damping cap. The damping cap thus provides anchoring points for at least the retaining elements and/or the retaining brackets of the central console. In this manner, additional fastening points directly on the underbody may be omitted, whereby welding studs or the like which are costly in terms of mounting technology no longer have to be provided as anchoring points on the underbody.

The damping cap may include at least receivers for the retaining elements and/or retaining brackets for fastening the central console. The retaining elements and/or retaining brackets may be screwed together with the shifting device to the underbody or center tunnel. Thus, the damping cap forms a type of linking member between the shifting device, on the one hand, and the retaining elements and/or retaining brackets for fastening the central console, on the other hand, wherein the fastening of the shifting device and damping cap together is particularly advantageous in terms of mounting. Moreover, additional fastening components for the retaining elements and/or retaining brackets on the underbody or a center tunnel formed there may be dispensed with.

The damping cap which can be designed approximately in the shape of a hood, may comprise an at least partially peripheral fastening flange. In the installed position, the fastening flange can surround the hood-shaped opening of the damping cap which is open at the bottom. Moreover, the additional holders for the retaining elements and/or for further add-on components may be formed on the fastening flange.

The receivers for the retaining elements may be configured as plug-in connections, additionally with a clip connection and/or a screw connection. In addition to the rapid mounting of the retaining elements made possible thereby, when using a one-piece damping cap, depending on the type of vehicle, different retaining elements may be installed for differently designed central consoles, wherein the plug-in connection portions are in each case of similar construction.

The receivers for the retaining elements and/or retaining brackets may be provided on the front faces located in the longitudinal direction of the vehicle and/or on adjacent flange regions of the damping cap, and thus form a front and a rear fastening point for the central console.

Particularly advantageously in terms of production technology, at least one of the plug-in connections may be designed as a telescopic guide with a tubular receiver, on the one hand, and a slide part cooperating therewith, on the other hand.

Alternatively or additionally, at least one of the plug-in connections may be designed with a T-shaped receiver and a slide part encompassing the receiver in a U-shaped manner.

In an development of the invention, in addition to the retaining bracket receivers and to the plug-in connections on the side walls and/or on lateral flange regions of the damping cap, further holders, for example retaining tabs, may be provided to which the side walls of the central console may be fastened by means of screw connections. Thus a stable fastening of the central console may be ensured in the underbody with uniform support via the damping cap.

Moreover, fastening devices for fastening electrical cables and/or air guidance elements inside the central console may be additionally provided on the walls of the damping cap and/or the retaining tabs. The fastening devices may, for example, be bores or integrally formed pins for producing clip connections which may be pushed in.

To achieve a defined association of the damping cap relative to the underbody or the center tunnel which is simple in terms of mounting, downwardly protruding centering pins may be arranged on the fastening flange of the damping cap, and which protrude into corresponding recesses of the underbody or center tunnel.

Moreover, a rubber-elastic sleeve compensating for the shifting movements of the floor shift and encompassing the floor shift may be inserted into the through-passage for the floor shift in the top wall of the damping cap so that, in this region in combination with the sleeve, double-walled noise damping is also provided in the central console.

Particularly advantageously in terms of production technology, the damping cap may be produced in one piece from plastics material with the integrally formed receivers for the retaining brackets, optionally the retaining tabs, and optionally the centering pins. The same applies to the retaining brackets for fastening the central console, the retaining brackets also being able to be produced from plastics material.

To achieve more reliable, sufficiently load-bearing screw connections between the damping cap and the retaining brackets for the central console and/or the screw connections between the retaining brackets and the central console and/or the screw connections between the central console and the retaining tabs of the damping cap, it is further proposed that sheet metal inserts or snap-action nuts made of metal are used which are pushed and latched onto wall regions of the components and screwed into the corresponding sheet metal screws penetrating bores in the wall regions.

Finally, in an embodiment of the invention, the central console may be designed in two parts with a lower part encompassing the damping cap and comprising lateral wall regions and a top part sealing the lower part at the top, wherein the lower part is fixedly connected via the retaining brackets to the damping cap and/or the center tunnel and the top part covers the corresponding screw connections. Amongst other things, this permits easy accessibility during the mounting, if required, of air guides and electrical cables or cable strands inside the central console, with an aesthetically attractive cover of the entire sub-assembly by means of the top part.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
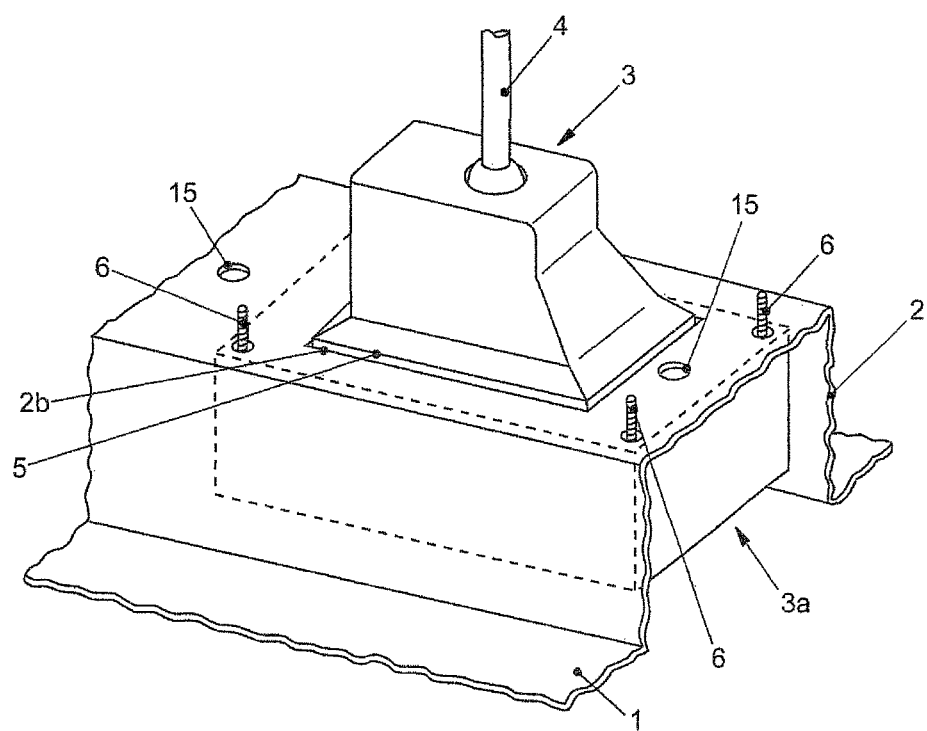
FIG. 1 shows a view obliquely from above of a shifting device, inserted into a center tunnel of an underbody of a passenger motor vehicle, comprising an upwardly protruding floor shift.

FIG. 1 shows partially an underbody 1 of the bodywork of a passenger motor vehicle comprising an integrally formed center tunnel 2 into which a shift housing 3a of a shifting device 3, in this case arranged simply in the shape of a box, is inserted into a corresponding, approximately rectangular recess 2b.

The shifting device 3 is part of a floor shift 4 of the motor vehicle and connected, in a manner not shown, via actuating elements (rods, cable pulls, etc.) to a variable speed transmission, not shown, which may be shifted accordingly via the floor shift 4 (or shift lever and/or selector lever) mounted in an articulated manner and protruding upwardly into the vehicle interior.

Figure 2:
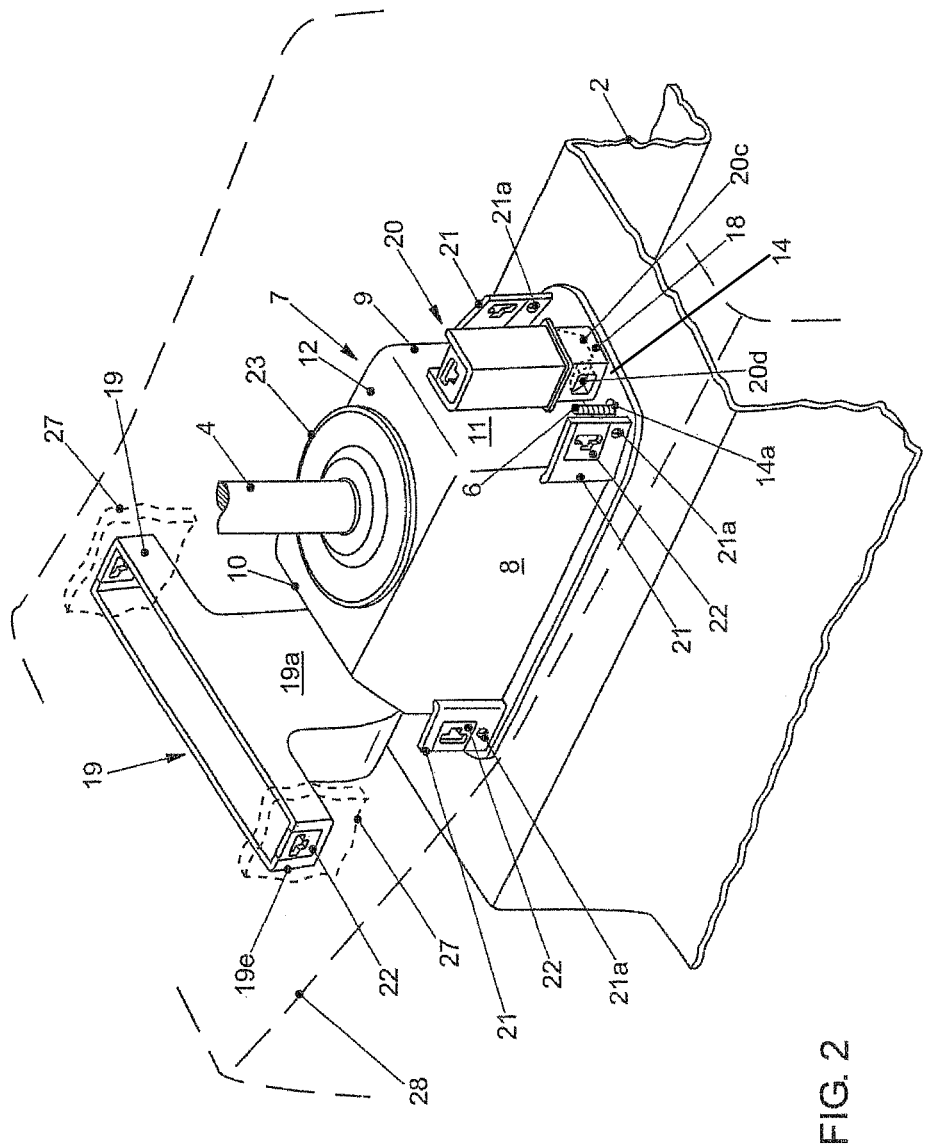
FIG. 2 shows a three-dimensional view of the damping cap which may be positioned onto the shifting device and/or onto the center tunnel with a rubber-elastic sleeve for the passage of the floor shift of the shifting device and with a front and a rear retaining bracket for a central console.
Figure 3:
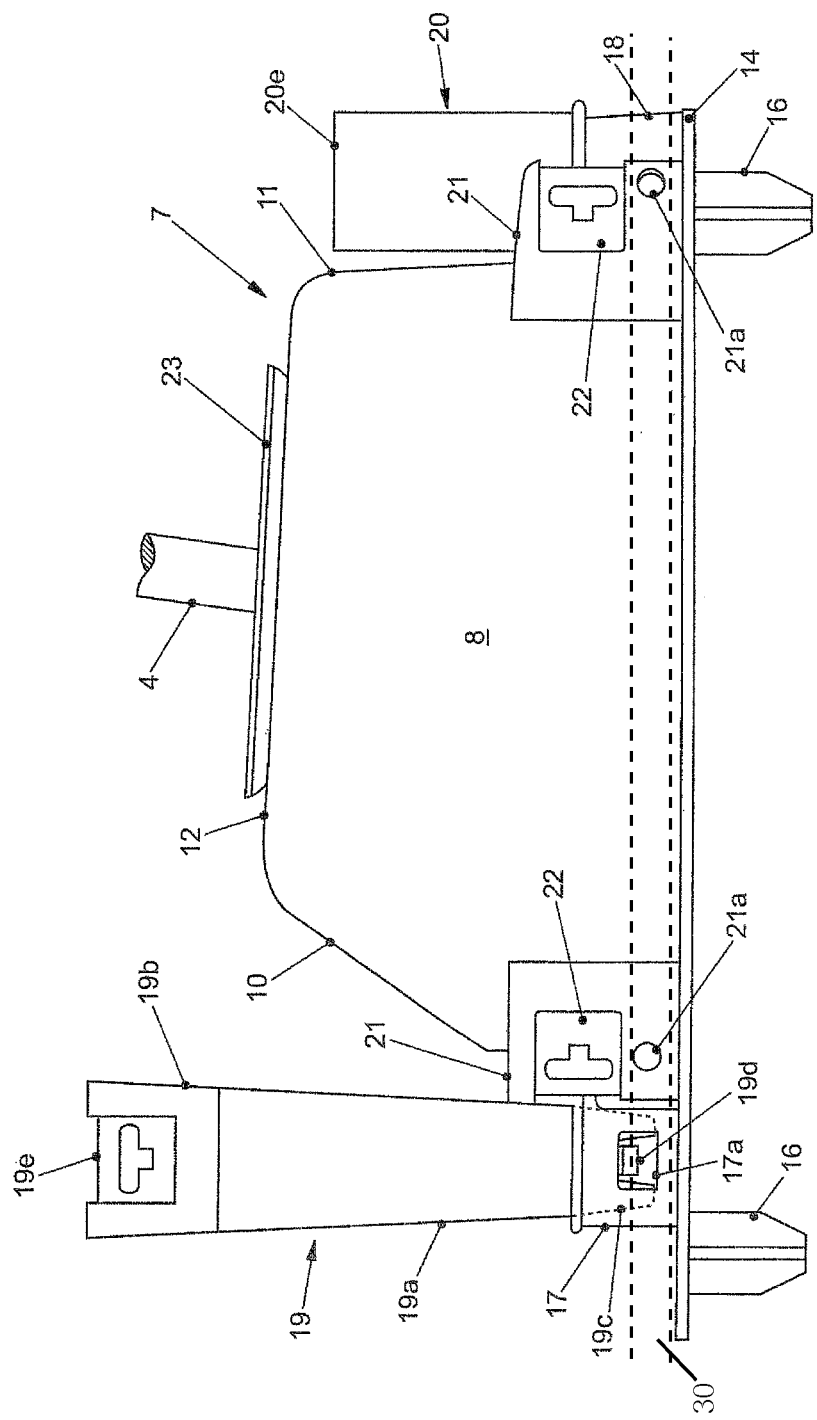
FIG. 3 shows the damping cap according to FIG. 2 in a side view, with integrally formed retaining tabs and downwardly protruding centering pins.
Figure 4:
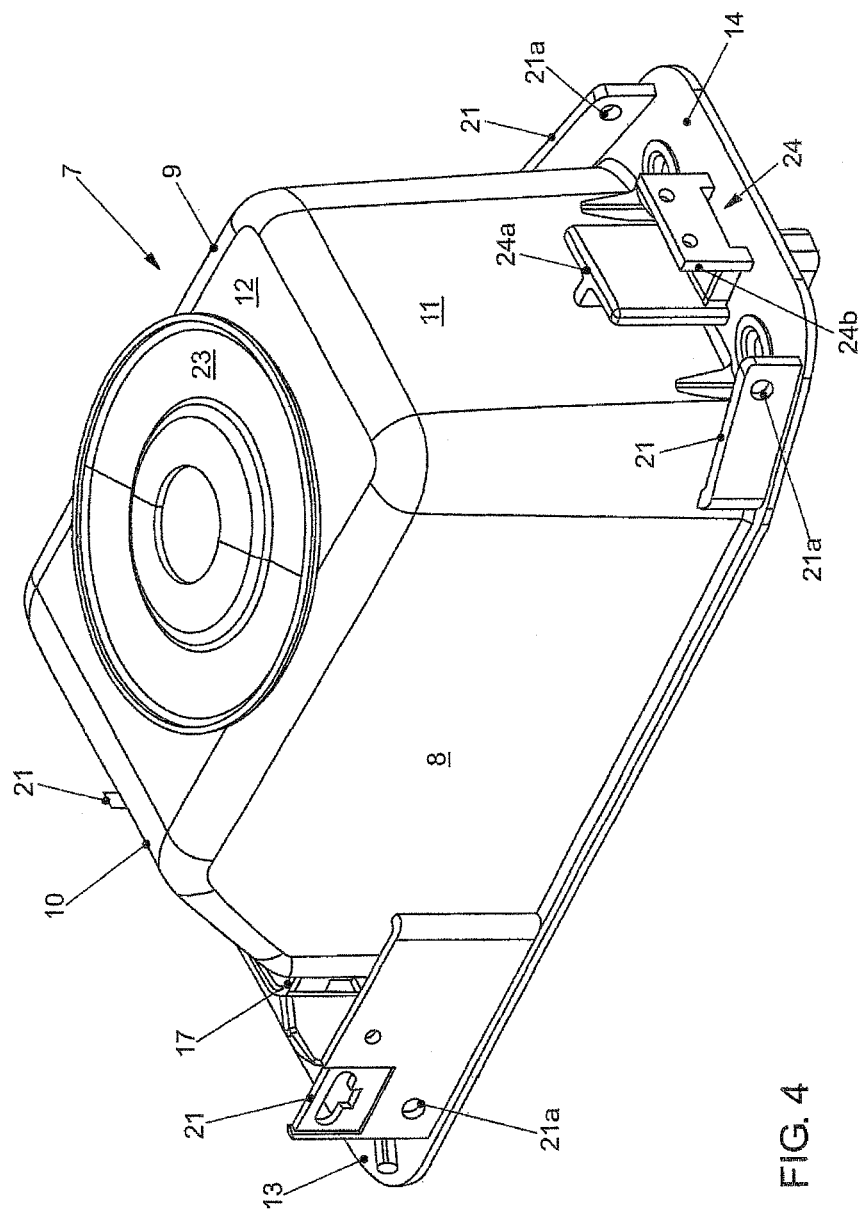
FIG. 4 shows a modified variant of the damping cap as claimed in FIGS. 2 and 3, with a T-shaped plug-in connection for the rear retaining bracket.

Four screw bolts 6 are arranged on an upper base plate 5 of the shift housing 3a of the shifting device 3, and protrude upwards through bores (without reference numerals) in the center tunnel 2 and may be fastened via a damping cap 7 which at the same time covers the shifting device 3, as shown in FIGS. 2 to 4.

In FIG. 2 the damping cap 7 is shown in the installed position. Retaining brackets 19, 20 are fastened to the damping cap 7, and a lower part 27 of a central console 28 is fastened to the retaining brackets. For reasons of clarity, only the contour line of the central console 28 is indicated in dashed lines. Only the front connecting points are shown of the lower part 27 of the central console 28 for securing to the front retaining bracket 19.

The damping cap 7 (FIGS. 2 and 3) is substantially made up of two side walls 8, 9, two front walls 10, 11 and a top wall 12, and is produced in one piece from a plastics material with a defined wall thickness.

Fastening flanges 13, 14 protruding to the front and to the rear are integrally formed on the front walls 10, 12, into which bores 13a, 14a (only partially visible), coinciding with the arrangement of the screw bolts 6, are incorporated. For fastening the damping cap 7 to the center tunnel 2, the damping cap is positioned, when the shifting device 3 is inserted from below, onto the screw bolts 6 thereof, and fastened by means of screw nuts, not shown.

For producing a structurally defined position of the damping cap 7 relative to the center tunnel 2, bores 15 (FIG. 1) are provided in the center tunnel 2, in each case approximately between the front and rear screw bolts 6, and into which downwardly protruding centering pins 16 (FIG. 3), integrally formed on the fastening flanges 13, 14, may be inserted during the mounting of the damping cap 7.

Tubular receivers 17, 18 which are open at the top are integrally formed on the fastening flanges 13, 14 of the damping cap 7, and are used as telescopic plug-in connections for retaining brackets 19, 20 which are to be fastened to the damping cap 7 and which are also produced from plastics material.

According to FIG. 2, the front retaining bracket 19 has an approximately vertical portion 19a and an upper transverse arm 19b which are designed as hollow profile parts. The vertical portion 19a terminates according to FIG. 3 at the bottom in a slide part 19c adapted to the square shape of the receiver 17. Two opposing latching hooks 19d are integrally formed in the slide part 19c, and when inserting the retaining bracket 19 into the receiver 17 are latched, acting as a clip connection, into corresponding recesses 17a of the receiver 17.

The rear retaining bracket 20, configured in an approximately linear manner and as a hollow profile part, is also inserted into the tubular receiver 18 via a slide part 20c integrally formed at the bottom, and as described above held via a clip connection with integrally formed latching hooks 20d, which in turn are held in recesses 18a of the tubular receiver 18.

On the side walls 8, 9 of the damping cap 7 and on the fastening flanges 13, 14, retaining tabs protruding to the front and to the rear (all denoted by 21) are integrally formed on both sides, and in the exemplary embodiment according to FIGS. 2 and 3 serve for additional fastening of the central console (not shown here).

Sheet metal insert parts and/or snap-action nuts 22 (only illustrated partially for improved clarity) are pushed onto and latched onto the retaining tabs 21 as well as on vertically and horizontally aligned wall portions 19e, 20e, of the retaining brackets 19, 20, by means of which and in combination with sheet metal screws to be screwed in, fixed connections may be produced with the central console or fittings, such as air guidance ducts, etc. As visible here, the alignment of the sheet metal screws in the rear retaining bracket 20 is vertical, whereas the two other screw connections extend horizontally.

Moreover, the retaining tabs 21 are provided with additional fastening devices in the form of integral bores 21a to which the central console 28 may be secured or, when fittings of the motor vehicle are mounted inside the central console, for example air guides, electrical cable strands, etc., as referred to by numeral 30 and illustrated by dotted lines in FIG. 3 may be secured, for example by clip connections. Retaining pins or the like may also be used instead of the bores 21a.

In the top wall 12 of the damping cap 7, a circular symmetrical recess (without a reference numeral) is provided, into which a rubber-elastic sleeve 23 is press-fitted and through which the floor shift 4 is guided out of the damping cap 7. The sleeve 23 sealingly encloses the floor shift 4 and compensates for shifting movements which occur.

Figure 5:
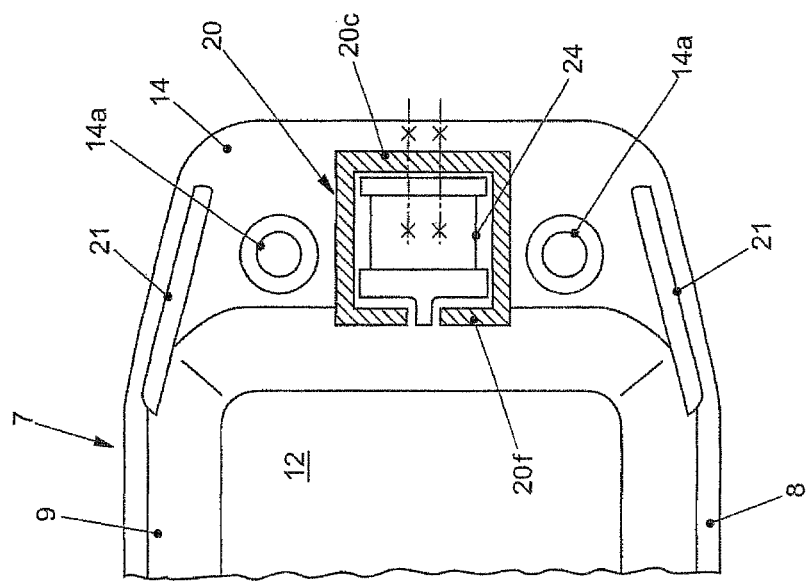
FIG. 5 shows a plan view of the damping cap as claimed in FIG. 4 with a sectional view of the rear plug-in connection.

FIGS. 4 and 5 show a modified receiver 24 for the rear retaining bracket 20 of the damping cap 7. Parts having the same function are provided with the same reference numerals.

The receiver 24 has an upwardly protruding T-shaped wall 24a (FIG. 4) and a wall part 24b aligned parallel thereto onto which the slide part 20c of the retaining bracket 20 comprising a vertical longitudinal groove 20f is positioned as a plug-in connection (FIG. 5). The slide part 20c is fixedly connected to the receiver 24 by a screw connection, not shown further. The screw connection (not shown) may be produced by snap-action nuts 22 positioned on the wall part 24b and sheet metal screws extending through the slide part 20c.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A fastening device on an underbody of a motor vehicle via which a shifting device is adapted to be fastened to the underbody, wherein the shifting device comprises a floor shift protruding into a vehicle interior and is covered by a central console, which has at least one retaining element and is fixedly connected to the underbody via the at least one retaining element, the retaining element having a first end and a second end, the fastening device comprising:
   a damping cap, which is configured to cover the shifting device, the damping cap including a through-passage for the floor shift and at least one receiver for receiving the first end of the retaining element of the central console,
   wherein the damping cap is configured to be fixedly attached to the underbody by a fastener, and
   wherein the retaining element is configured to be separately fastened directly to the receiver of the damping cap at the first end and directly to the central console at the second end, thereby the central console being fixedly connected to the underbody by the interposition of the damping cap.

2. A fastening device on an underbody of a motor vehicle via which a shifting device is adapted to be fastened to the underbody, wherein the shifting device comprises a floor shift protruding into a vehicle interior and is covered b a central console, which has at least one retaining element and is fixedly connected to the underbody via the at least one retaining element, the retaining element having a first end and a second end, the fastening device comprising:
   a damping cap, which is configured to cover the shifting device, the damping cap including a through-passage for the floor shift and at least one receiver for receiving the first end of the retaining element of the central console,
   wherein the damping cap is configured to be fixedly attached to the underbody by a fastener,
   wherein the retaining element is configured to be separately fastened to the receiver of the damping cap at the first end and to the central console at the second end, thereby the central console being fixedly connected to the underbody by the interposition of the damping cap, and
   wherein a shift housing of the shifting device is screwed to an underside of the underbody, and wherein the shift housing together with the damping cap arranged on an upper face of the underbody are fastened at identical fastening points.

3. The fastening device as claimed in claim 1, wherein the receiver for the retaining element is configured as a plug-in connection, additionally with a clip connection and/or a screw connection.

4. The fastening device as claimed in claims 1, wherein the receiver for the retaining element is provided on front faces located in a longitudinal direction of the vehicle and/or on fastening flanges of the damping cap adjacent to the front faces.

5. The fastening device as claimed in claim 3, wherein the plug-in connection is configured as a telescopic guide with a tubular receiver and a slide part cooperating therewith.

6. The fastening device as claimed in claim 3, wherein the plug-in connection has a T-shaped receiver and a slide part encompassing wall portions thereof in a U-shaped manner.

7. A fastening device on an underbody of a motor vehicle via which a shifting device is adapted to be fastened to the underbody, wherein the shifting device comprises a floor shift protruding into a vehicle interior and is covered by a central console which has at least one retaining element and is fixedly connected to the underbody via the at least one retaining element, the retaining element first end and a second end, the fastening device comprising:
   a damping cap, which is configured to cover the shifting device, the damping cap including a through-passage for the floor shift and at least one receiver for receiving the first end of the retaining element of the central console,
   wherein the damping cap is configured to be fixedly attached to the underbody by a fastener,
   wherein the retaining element is configured to be separately fastened to the receiver of the damping can at the first end and to the central console at the second end, thereby the central console being fixedly connected to the underbody by the interposition of the damping cap, and
   wherein the damping cap further comprises holders in addition to the receiver to which the central console is configured to be fastened via screw connections.

8. The fastening device as claimed in claim 1, wherein fastening devices for fastening electrical cables and/or air guidance elements arranged inside the central console are additionally provided on the damping cap.

9. The fastening device as claimed in claim 1, wherein the damping cap further comprises an at least partially peripheral fastening flange on which the receiver and/or downwardly protruding centering pins are arranged and which protrude into corresponding recesses of a center tunnel.

10. The fastening device as claimed in claim 1, wherein the damping cap further comprises a centering pin that protrude downwardly for positioning the damping cap onto to the underbody.

11. The fastening device as claimed in claim 1, wherein the damping cap includes front walls, sidewalls each connected to the front walls, and a top wall connected to the front walls and the side walls, the side walls extending in a longitudinal direction of the center console, and wherein the damping cap is made of plastic.

12. The fastening device as claimed in claim 1, wherein the damping cap further includes a rubber-elastic sleeve through which the floor shift is provided.

13. The fastening device as claimed in claim 1, wherein the retaining element has a larger cross-sectional area than a cross-sectional area of the receiver, such that the receiver is inserted into the retaining element during installation.

14. The fastening device as claimed in claim 1, wherein the receiver has a cross-sectional shape that at least partially corresponds to a cross section of the retaining element.

15. The fastening device as claimed in claim 1, wherein a top surface of the damping cap is provided under the center console.

16. The fastening device as claimed in claim 7, wherein the holder is a retaining tab that is integrally formed on the damping cap, and wherein the retaining tab is fastened on a side of the center console.

* * * * *